United States Patent
Miwa

[11] Patent Number: 5,881,604
[45] Date of Patent: Mar. 16, 1999

[54] INDUSTRIAL ROBOT

[75] Inventor: Teiji Miwa, Saitama-ken, Japan

[73] Assignee: Honda Giken Kogyo Kabushiki Kaisha, Tokyo, Japan

[21] Appl. No.: 842,538

[22] Filed: Apr. 15, 1997

[30] Foreign Application Priority Data

Aug. 9, 1996 [JP] Japan .................................. 8-211212
Aug. 9, 1996 [JP] Japan .................................. 8-211213

[51] Int. Cl.$^6$ .................................................. G05G 11/00
[52] U.S. Cl. ............................ 74/490.05; 74/490.03; 901/15; 901/25
[58] Field of Search .................. 74/490.01, 490.02, 74/490.03, 490.05; 901/15, 23, 25, 48

[56] References Cited

U.S. PATENT DOCUMENTS

| | | | |
|---|---|---|---|
| 4,555,217 | 11/1985 | Wright | 414/735 |
| 4,576,544 | 3/1986 | Passemard et al. | 414/735 |
| 4,846,018 | 7/1989 | Matsumoto et al. | 901/25 X |
| 5,115,690 | 5/1992 | Torii et al. | 901/15 X |
| 5,459,925 | 10/1995 | Akeel et al. | 901/25 X |
| 5,497,674 | 3/1996 | Inada | 74/490.03 |
| 5,669,269 | 9/1997 | Katamine et al. | 74/490.02 |
| 5,697,255 | 12/1997 | Miyamoto et al. | 74/490.01 |
| 5,732,599 | 3/1998 | Iriyama | 74/490.02 |

FOREIGN PATENT DOCUMENTS

| | | |
|---|---|---|
| 0 222 018 | 5/1987 | European Pat. Off. . |
| 57-27685 | 2/1982 | Japan . |

Primary Examiner—Charles A. Marmor
Assistant Examiner—David Fensternmacher
Attorney, Agent, or Firm—Armstrong, Westerman, Hattori, McLeland & Naughton

[57] ABSTRACT

In an industrial robot having a rotatable robot main body 3, a first robot arm 5 which is mounted, via a first joint portion 4, on an upper end of the robot main body 3 so as to be vertically swingable, and a second robot arm 7 which is mounted, via a second joint portion 6, on a front end of the first robot arm 5 via a second joint portion 6 so as to be vertically swingable, the assembling is facilitated and the miniaturization of the robot is attained. The first and second joint portions 4, 6 are arranged in a cantilevered construction in which each of the first and second robot arms 5, 7 is supported on the robot main body 3 and the first robot arm 5, respectively, in a cantilevered manner via a driving reduction gear Ry, Rw of each of the first and second robot arms 5, 7, respectively. The driving reduction gears Ry, Rw are disposed so as to cross an identical central plane "a" that includes an axis of rotation of the robot main body 3.

7 Claims, 10 Drawing Sheets

INDUSTRIAL ROBOT

BACKGROUND OF THE INVENTION

1. Field of the Invention

The present invention relates to an industrial robot which is provided with a rotatable robot main body, a first robot arm which is mounted, via a first joint portion, on an upper end of the robot main body so as to be swingable in the vertical direction, and a second robot arm which is mounted, via a second joint portion, on a front end of the first robot arm so as to be swingable in the vertical direction.

2. Description of the Related Art

Conventionally, in this kind of industrial robot, it is normal practice to constitute each of the joint portions by a construction in which each of the robot arms is supported on both axial sides of each of the joint portions. This construction has, however, disadvantages in that the construction of the joint portions becomes complicated and that the assembly thereof becomes troublesome.

In order to solve the above-described disadvantages, there is known an industrial robot as disclosed in Japanese Published Unexamined Patent Application No. 27685/1982. In this industrial robot, a first joint portion at an upper end of a robot main body and a second joint portion at a front end of a first robot arm are constituted in a cantilevered construction in which the first robot arm and the second robot arm are respectively supported, via a driving reduction gear, in a manner cantilevered in the axial direction of each of the joints. It is thus so arranged that each of the robot arms can be assembled to each of the joint portions from one axial side thereof to facilitate the assembling.

In the above-described conventional industrial robot which is provided with joint portions of cantilevered construction, the first robot arm and the second robot arm are respectively mounted on the robot main body and on the first robot arm in a manner offset to one axial side of each of the joint portions. Partial loads due to this offset will thus operate on the robot main body. This industrial robot has therefore disadvantages in that the positioning accuracy of the robot will be adversely affected and that the teaching of the robot becomes troublesome.

In view of the above-described points, the present invention has an object of providing an industrial robot in which each of the joint portions is made in a cantilevered construction to facilitate the assembling, and in which the above-described disadvantages associated with providing the joint portions of a cantilevered construction are eliminated.

SUMMARY OF THE INVENTION

In order to attain the above and other objects, the present invention is an industrial robot comprising: a rotatable robot main body; a first robot arm which is mounted, via a first joint portion, on an upper end of the robot main body so as to be vertically swingable; a second robot arm which is mounted, via a second joint portion, on a front end of the first robot arm so as to be vertically swingable; each of the first and second joint portions being arranged in a cantilevered construction in which each of the first and second robot arms is supported on the robot main body and on the first robot arm, respectively, in a manner cantilevered in an axial direction of each of the joint portions via a driving reduction gear of each of the first and second robot arms, respectively; characterized in that the driving reduction gears of the first robot arm and second robot arm are disposed so as to cross an identical central plane that includes an axis of rotation of the robot main body.

Preferably, when a Y axis is defined to be an axial line of the first joint potion and a W axis is defined to be an axial line of the second joint portion, the first joint portion is constituted by forming a stationary bracket and a movable bracket on one side in the Y axis direction at an upper end of the robot main body and on the other side in the Y axis direction at a rear end of the first robot arm, respectively, in order to dispose the driving reduction gear of the first robot arm between both the brackets for the first joint portion, and also the second joint portion is constituted by forming a stationary bracket and a movable bracket on one side in the W axis direction at a front end of the first robot arm and on the other side in the W axis direction at a rear end of the second robot arm, respectively, in order to dispose the driving reduction gear of the second robot arm between both said brackets for the second joint portion.

According to this arrangement, the axial dimensions of the first joint portion and the second joint portion can be contained within the lateral width of the robot main body and the first robot arm, respectively. Further, the driving reduction gear of each of the robot arms is disposed in the axial center of each of the joint portions. By thus disposing each of the reduction gears so as to cross the identical central plane that includes the axis of rotation of the robot main body, the entire arm made up of the first robot arm and the second robot arm will extend to lie along the central plane. Therefore, a partial load to operate on the robot main body can be reduced as small as possible to thereby improve the positioning accuracy of the robot. The teaching of the robot also becomes easy.

Further, it is preferable to provide a rib in a projecting manner on an outer side surface of the movable bracket for the first joint portion so as to enclose a coupling portion to couple the first robot arm to the driving reduction gear of the first robot arm, thereby reinforcing the movable bracket. In this case, by utilizing the space enclosed by the rib as a space for laying out therein a wiring material which is inserted into the first robot arm, the layout of the wiring can be made neat.

In addition, in case there is attached to the second robot arm a wrist which is rotatable about an axial line on a plane which crosses the W axis at right angles, it is preferable to make the following arrangements. Namely, the second robot arm is arranged to have a flat disk-like portion which lies along a plane which crosses at right angles a V axis which is defined to be the axis of rotation of the wrist. The movable bracket for the second joint portion is provided in an upwardly and backwardly projecting manner from a portion on the above-described other side in the W axis direction on a rear surface of the disk-like portion. A driving motor of the wrist is attached to the above-described other side portion in the W axis direction on the rear surface of the disk-like portion below the movable bracket for the second joint portion. And the wrist is attached to a front surface of the disk-like portion via that reduction gear of the wrist which is coupled to the driving motor.

According to the above arrangement, the driving motor of the wrist can be disposed in a good space efficiency below the movable bracket for the second joint portion so as to overlap the second joint portion. Therefore, the second robot arm can be made shorter in length and the robot can thus be miniaturized.

Further, the disk-like portion of the second robot arm can also be so disposed as to be contained inside the width dimension of the first robot arm. Therefore, a twisting load to operate on the first robot arm via the second robot arm can be reduced, and the positioning accuracy of the industrial robot can be improved.

By attaching the driving motor for the wrist as described above, the driving motor will be disposed offset relative to the V axis which is the axis of rotation of the wrist. As a result, it becomes possible to form, in the disk-like portion of the second robot arm and in the driving reduction gear of the wrist, a hollow portion which penetrates therethrough along the V axis. The wiring materials for the members to be equipped in the wrist can thus be inserted into the hollow portion, and the layout of the wiring materials can thus be made neat.

In addition, it is preferable to provide a rib provided in a projecting manner on an outer side surface of the movable bracket for the second joint portion so as to enclose a coupling portion to couple the second robot arm to the driving reduction gear of the second robot arm. In this case, by utilizing the space enclosed by the rib as a space for laying out therein wiring materials for the driving motor of the wrist and for members equipped in the wrist, the layout of the wiring materials can be made neat.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
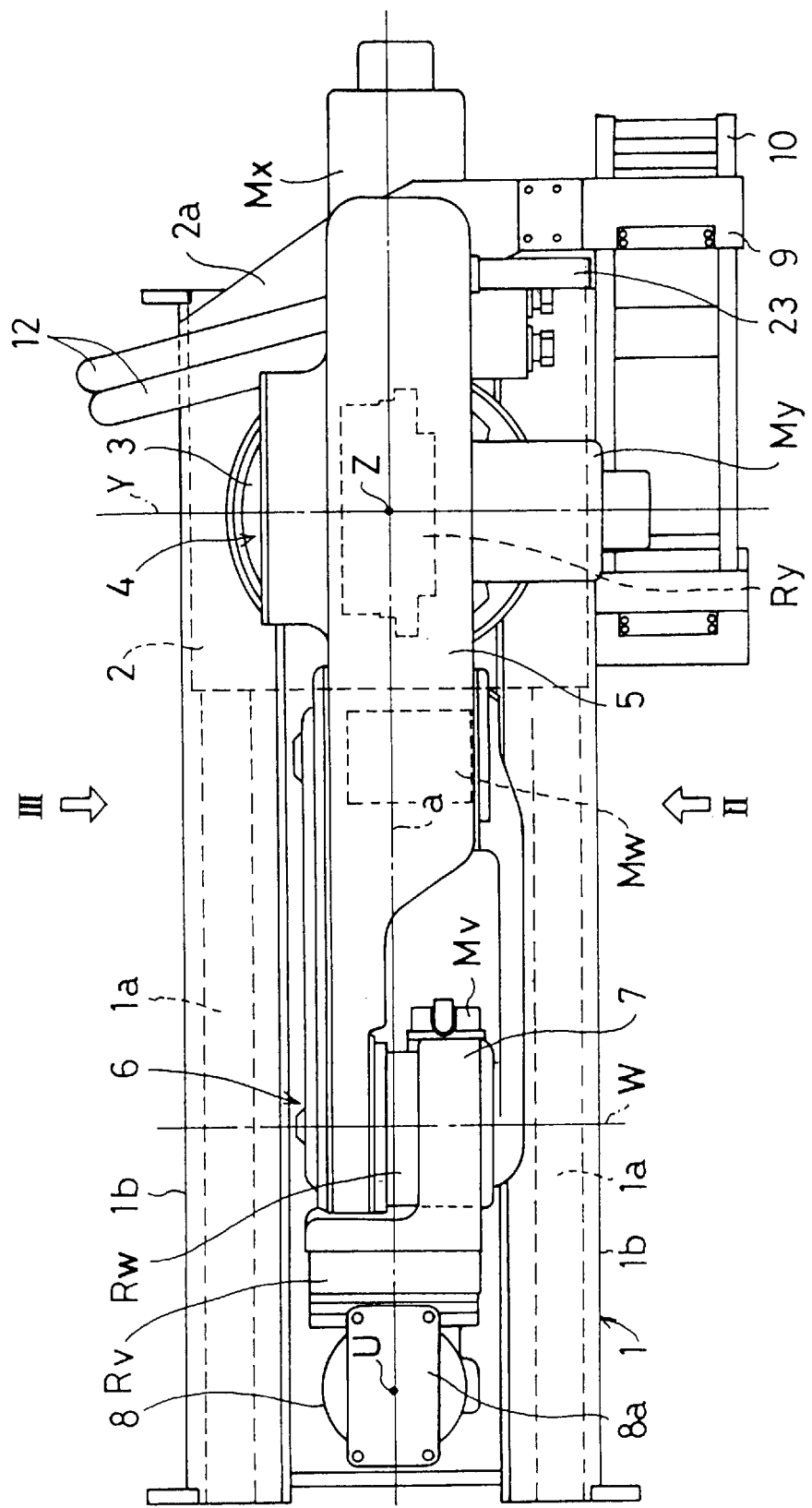
FIG. 1 is a plan view of an example of an industrial robot of the present invention.
Figure 2:
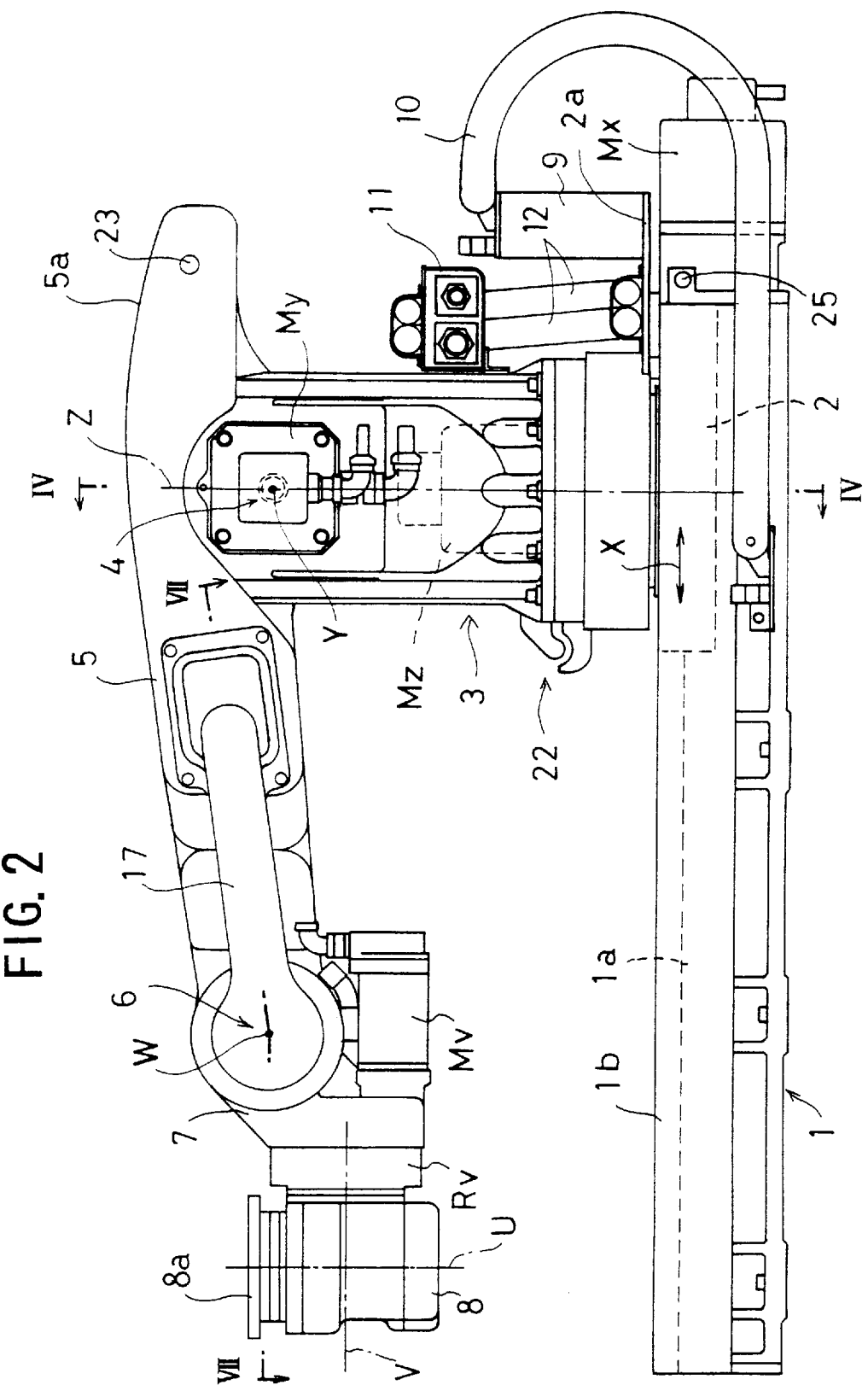
FIG. 2 is a side view of the robot as seen in the direction of an arrow II in FIG. 1.
Figure 3:
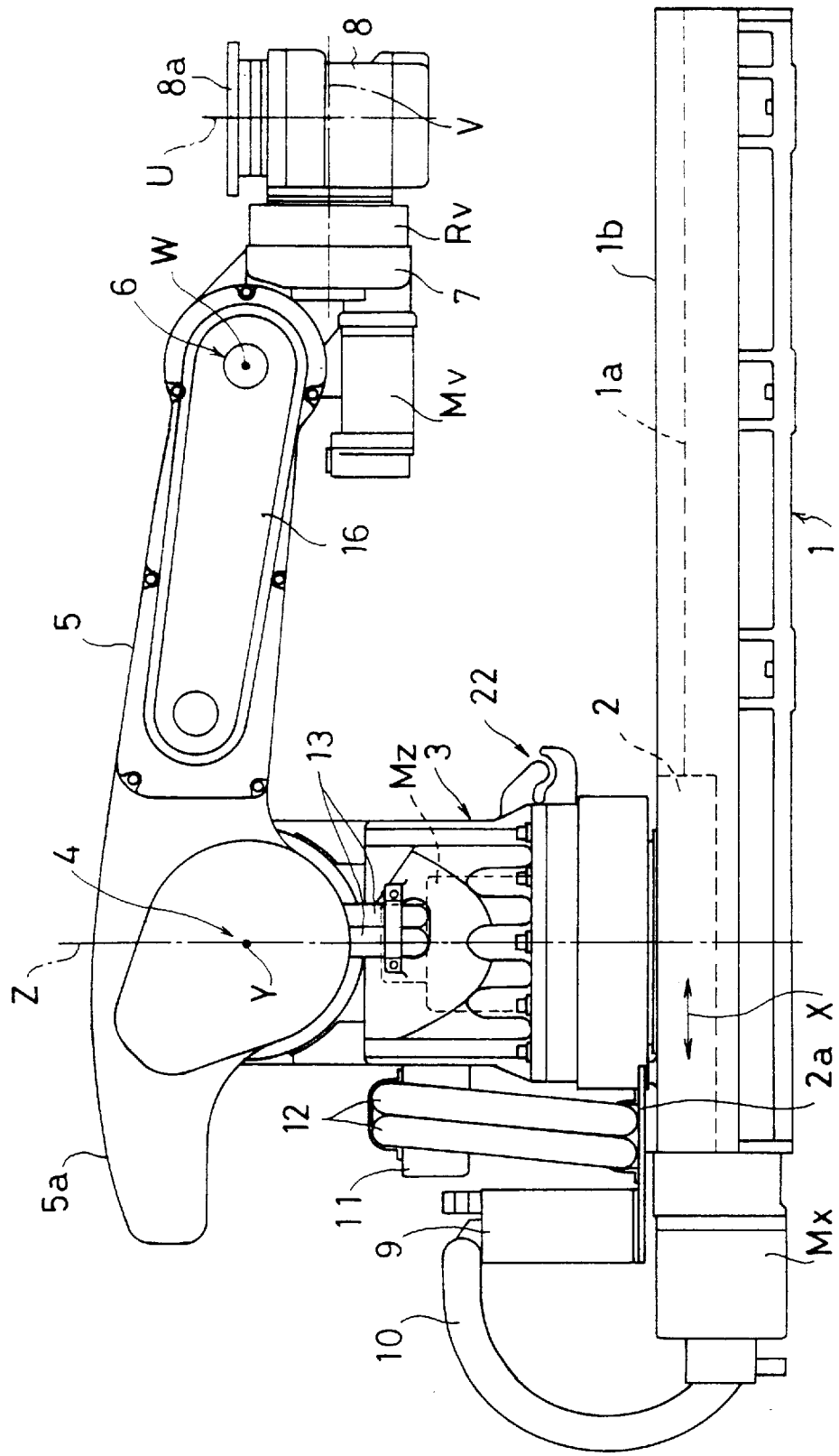
FIG. 3 is a side view of the robot as seen in the direction of an arrow III in FIG. 1.

Referring to FIGS. 1–3, reference numeral 1 denotes a bed which extends in a longitudinal (i.e., back and forth) direction. There is provided a movable table 2 which is moved by a driving motor Mx via a ball screw mechanism (not illustrated) in an X axis direction, which is the longitudinal direction, along guide rails 1a on the bed 1. On this movable table 2, there is mounted a robot main body 3 which is rotatable about a vertical Z axis. A first joint portion 4 is provided at an upper end of the robot main body 3, and a first robot arm 5 which extends forwards is mounted on the first joint portion 4 so as to be swingable in a vertical direction (up and down) about a horizontal Y axis. Further, a second joint portion 6 is provided at a front end of the first robot arm 5, and a second robot arm 7 is mounted on this second joint potion 6 so as to be swingable in the vertical direction about a W axis which is parallel with the Y axis. A wrist 8 is mounted on or attached to a front end of the second robot arm 7 so as to be rotatable about a V axis which lies on a plane which crosses the W axis at right angles. The wrist 8 is provided with a tool attaching plate 8a which is rotatable about a U axis which crosses the V axis at right angles, via a driving motor and a reduction gear (both not illustrated) which are built in the wrist. In this manner, an industrial robot having a freedom of six axes of X, Z, Y, W, V and U is constituted.

The movable table 2 is provided with a shelf board 2a. A cable support rack 9 is vertically disposed on one side in a rear end portion of the shelf board 2a. A cable guide 10 for carrying or supporting therein wiring materials is disposed between the bed 1 and the cable support rack 9. Further, a distributor 11 is attached to a rear side surface of the robot main body 3. Flexible cable tubes 12 are disposed between the shelf board 2a and the distributor 11, and the wiring materials are connected from the cable support rack 9 to the distributor 11 via the cable tubes 12. Electric power is thus supplied from the distributor 11 to a driving motor Mz for the robot main body 3 and a driving motor My for the first robot arm 5. Electric power is also supplied from the distributor 11 via the wiring materials to be introduced through the robot main body 3 into the first robot arm 5, to the driving motor Mw for the second robot arm 7, a driving motor Mv for the wrist 8, and the driving motor built in the wrist 8. In the figures, reference numeral 1b denotes rail covers which are attached to the bed 1.

Figure 4:
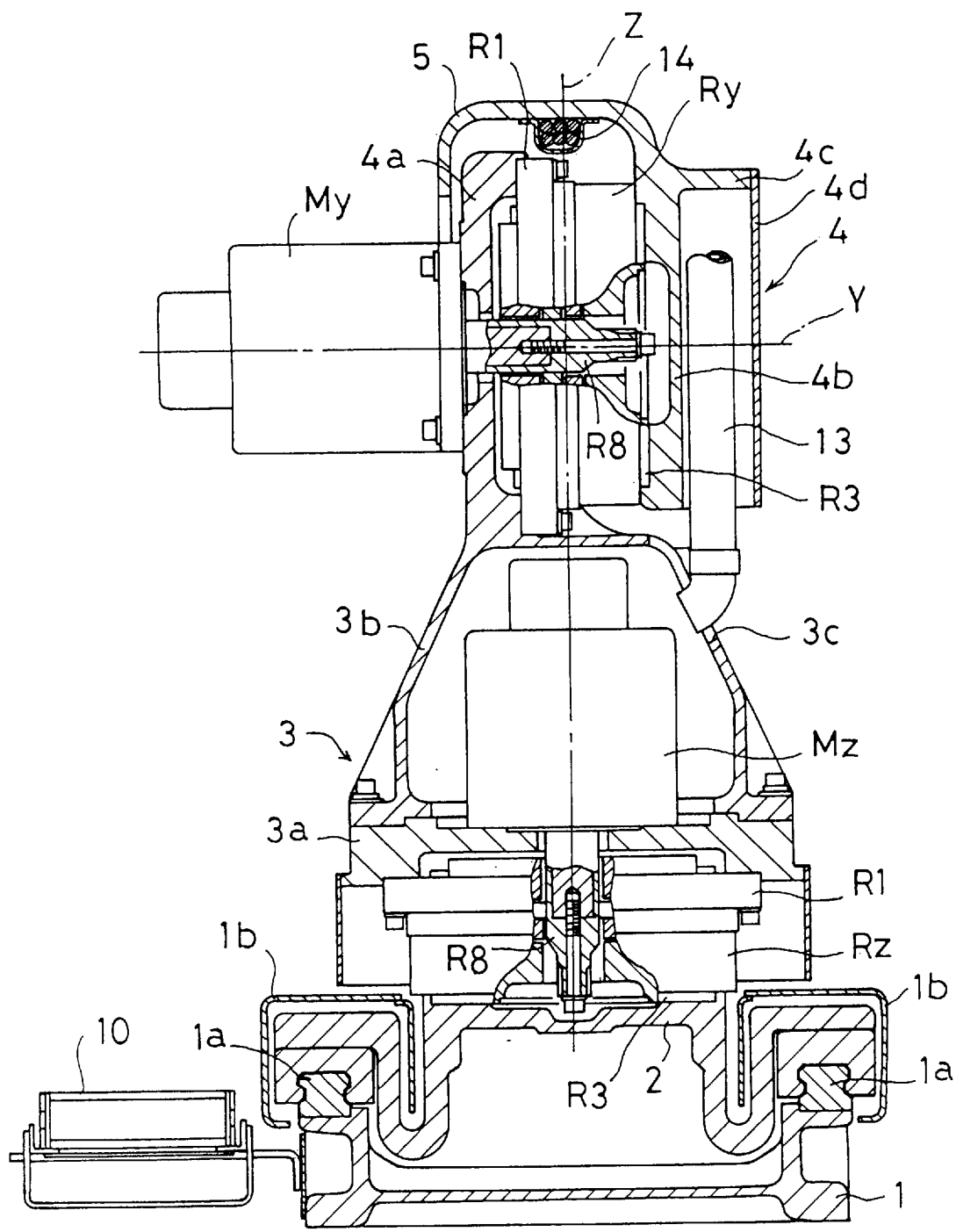
FIG. 4 is a sectional view taken along the line IV—IV in FIG. 2.
Figure 5B:
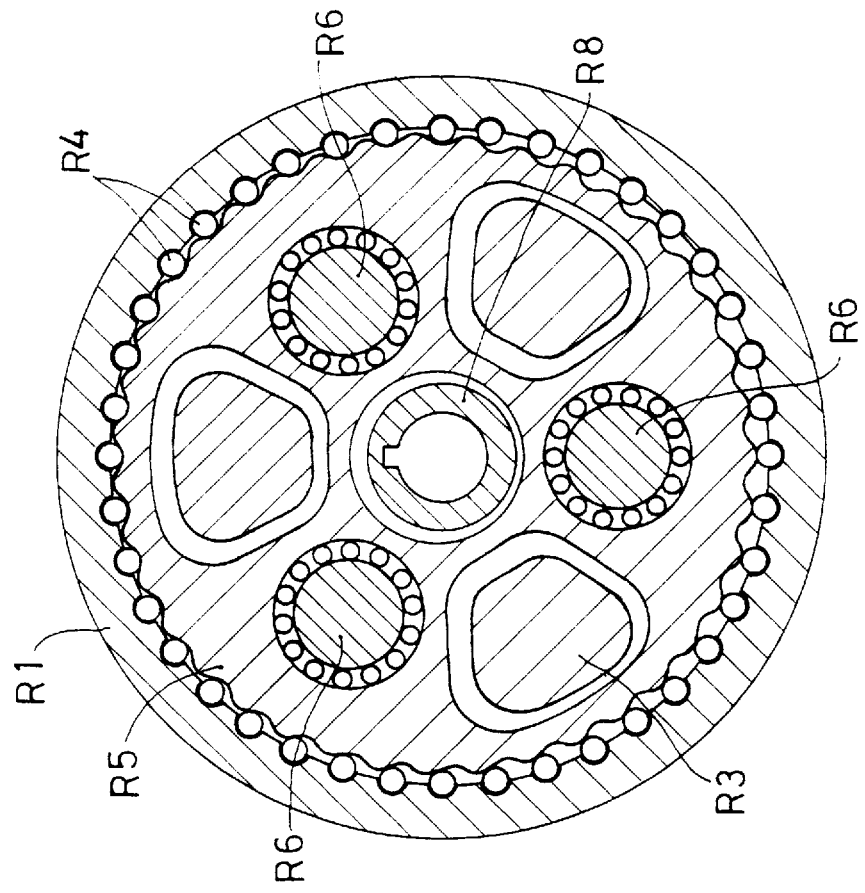
FIG. 5A is an axial sectional view of a reduction gear and FIG. 5B is a diametrical sectional view of the reduction gear.
Figure 5A:
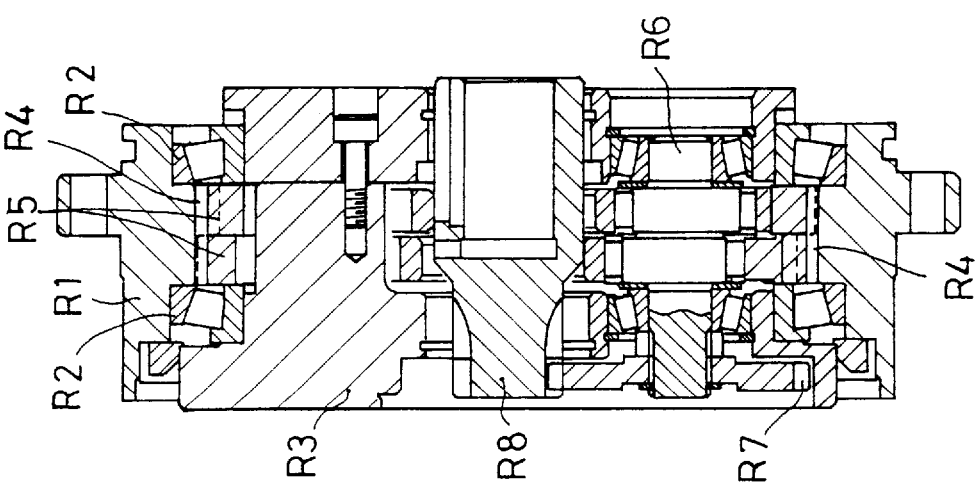

The robot main body 3 is constituted, as shown in FIG. 4, by a base portion 3a on which is vertically provided the driving motor Mz, and a cover portion 3b which is bolted to the base portion 3a so as to cover, from an upper side, the portion in which the driving motor Mz is disposed. That driving reduction gear Rz of the robot main body 3 which is coupled to the driving motor Mz is mounted to the lower surface of the base portion 3a, and the robot main body 3 is placed on the movable table 2 via the reduction gear Rz. The reduction gear Rz is constituted, as shown in FIGS. 5A and 5B, by a type known and marketed under the name CYCLO reduction gear having a casing R1, a shaft R3 which is rotatably supported inside the casing R1 via a pair of bearings R2, a pair of planetary gears R5, R5 which are engaged with pins R4 which are mounted on an inner peripheral surface of the casing R1 at an equal distance from one another, three crank shafts R6 which are rotatably supported at circumferentially three portions of the shaft R3 and which cause the pair of planetary gears R5, R5 to revolve at a phase difference of 180° from each other, and an input gear R8 which is engaged with a spur gear R7 on an end portion of each of the crank shafts R6. The casing R1 and the shaft R3 of the reduction gear Rz are bolted to the base portion 3a and the movable table 2, respectively, and an output shaft of the driving motor Mz is coupled to the input gear R8. It is thus so arranged that the robot main body 3 is rotated about the Z axis by the driving motor Mz via the reduction gear Rz.

The first joint portion 4 is constituted in a cantilevered construction in which the first robot arm 5 is supported on the robot main body 3 in a manner cantilevered in the axial direction of the first joint portion 4 (i.e., in the Y axis direction) via a driving reduction gear Ry of the first robot arm 5. In this case, if the first robot arm 5 is mounted on the robot main body 3 in a manner offset sidewise in the Y axis direction, the miniaturization of the robot becomes difficult, and a partial load is operated on the robot main body 3 via the first robot arm 5, resulting in a bad effect on the positioning accuracy of the robot.

As a solution, in the present embodiment, the first joint portion 4 is constituted in the following manner. Namely, a stationary bracket 4a for the first joint portion 4 is provided in a projecting manner, while deviating to one side in the Y axis direction, on an upper end of the cover portion 3b of the robot main body 3. That movable bracket 4b for the first joint portion 4 which lies opposite to the stationary bracket 4a is formed in the other side in the Y axis direction of the rear end portion of the first robot arm 5. The driving reduction gear Ry for the first robot arm 5 is disposed between both the brackets 4a, 4b. In this manner, the dimension in the axial direction (Y axis direction) of the first joint portion 4 can be contained within the width in the Y axis direction of the robot main body 3, to thereby attain the miniaturization of the robot. Further, the first robot arm 5 can also be contained within the width in the Y axis direction of the robot main body 3. Therefore, a partial load to operate on the robot main body 3 can be reduced and consequently the positioning accuracy of the robot can be improved. Still furthermore, in the present embodiment, the first joint portion 4 is provided right above the portion in which the driving motor Mz of the robot main body 3 is disposed, to thereby eliminate the offset of the Y axis in the longitudinal direction relative to the Z axis. The dimension in the longitudinal direction of the robot main body 3 inclusive of the first joint portion 4 is thus reduced to enable to attain a further miniaturization of the robot.

The driving reduction gear Ry of the first robot arm 5 is constituted by a CYCLO reduction gear which is similar to the one shown in FIGS. 5A and 5B. The casing R1 of the reduction gear Ry and the shaft R3 are bolted to the stationary bracket 4a and the movable bracket 4b, respectively. The output shaft of that driving motor My of the first robot arm 5 which is attached to an outer side surface of the stationary bracket 4a is coupled to the input gear R8 of the reduction gear Ry. The first robot arm 5 is thus arranged to be swung in the vertical direction by the driving motor My via the reduction gear Ry.

Figure 6:
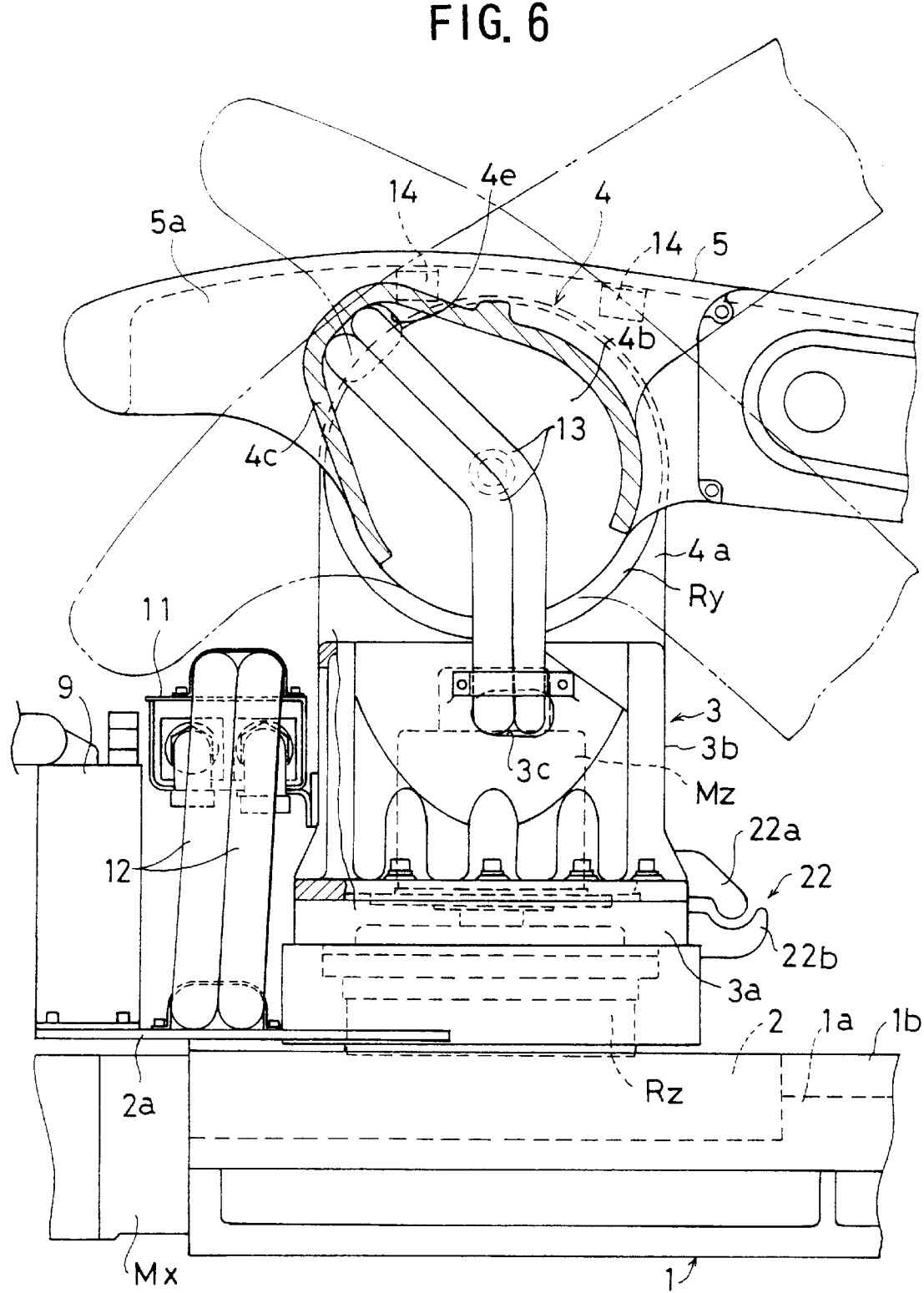
FIG. 6 is a right-side view, partly shown in section, of FIG. 4.

On an outer side surface of the movable bracket 4b of the first joint portion 4, there is provided, as shown in FIG. 6, a rib 4c in a projecting manner so as to enclose the coupling portion to couple the first robot arm 5 to the reduction gear Ry. The movable bracket 4b is thus reinforced by the rib 4c in order to secure a mounting strength of attaching the first robot arm 5 to the first joint portion 4. On an outer end surface of the rib 4c there is attached a cover plate 4d which covers the space to be enclosed by the rib 4c. Flexible cable tubes 13 are disposed in the space such that the lower ends of the tubes 13 face a perforation 3c which opens in the side surface of the cover portion 3b of the robot main body 3, and that the upper ends of the tubes 13 face a perforation 4e which opens in an upper portion of the movable bracket 4b. The wiring materials to supply electric power to the driving motor Mw of the second robot arm 7, the driving motor Mv of the wrist 8, and the driving motor built in the wrist 8 are introduced from the distributor 11 into the first robot arm 5 via the robot main body 3 and the cable tubes 13. In this manner, by utilizing the space enclosed by the rib 4c as a space for arranging or laying out therein the wiring materials, the wiring layout can be made neat. In the figures, reference numeral 14 denotes those cable holding pieces for holding the wiring materials which are provided inside the first robot arm 5.

Figure 7:
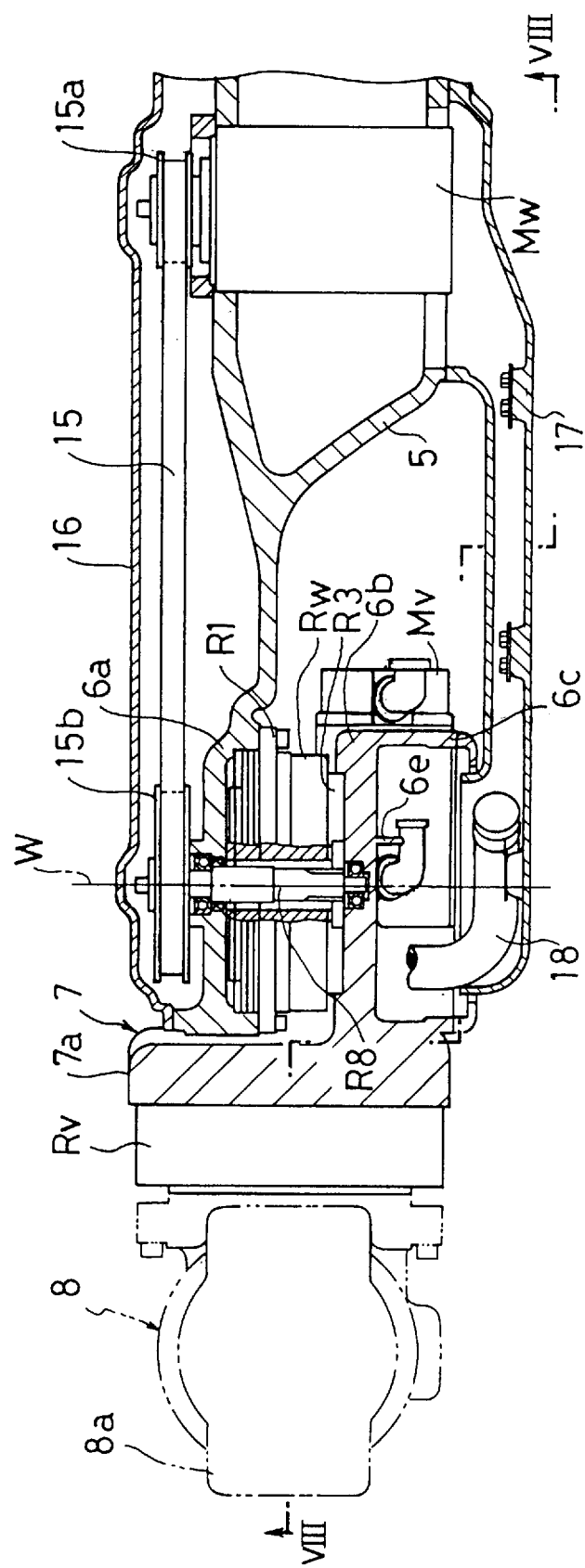
FIG. 7 is a sectional view taken along the line VII—VII in FIG. 2.
Figure 8:
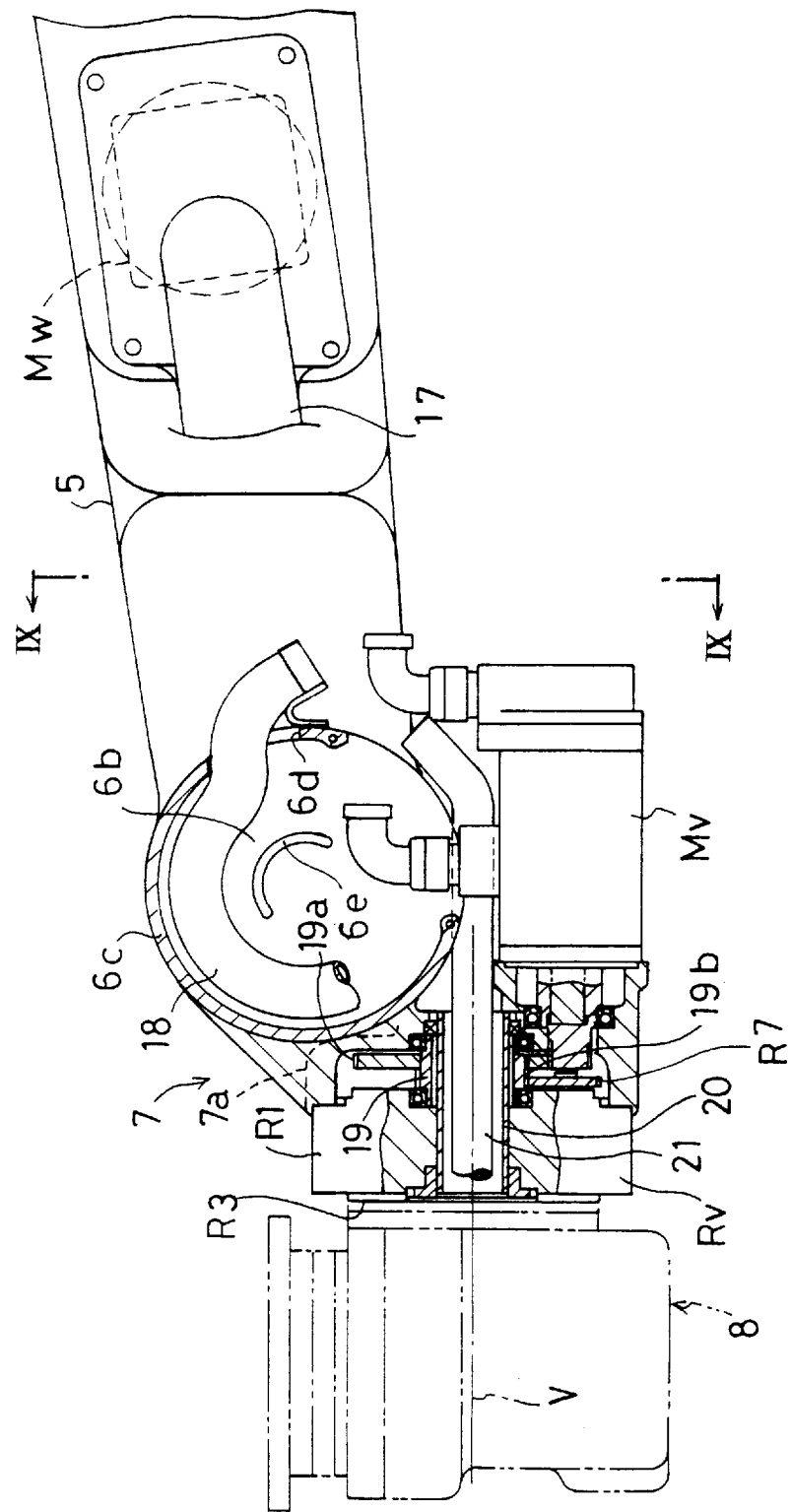
FIG. 8 is a sectional view taken along the line VIII—VIII in FIG. 7.
Figure 9:
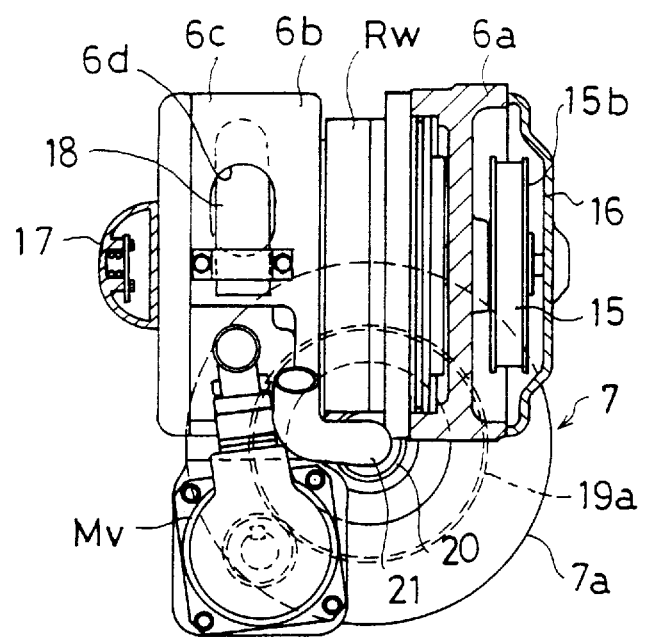
FIG. 9 is a sectional view taken along the line IX—IX in FIG. 8.

The second joint portion 6 at the front end of the first robot arm 5 is constituted, as shown in FIGS. 7–9, in a cantilevered construction in which the second robot arm 7 is supported on the first robot arm 5 in a manner cantilevered in the axial direction of the second joint portion 6 (W axis direction) via a driving reduction gear Rw of the second robot arm 7. In this case, if the second robot arm 7 is mounted on the first robot arm 5 in a manner offset sidewise in the W axis direction, the miniaturization of the robot becomes difficult, and a twisting load is operated on the first robot arm 5 via the second robot arm 7. This results in a bad effect on the positioning accuracy of the robot.

As a solution, in the present embodiment, the second robot arm 7 is constituted into one having a flat disk-like portion 7a which lies along a plane which crosses the axis of rotation (V axis) of the wrist 8 at right angles, and that movable bracket 6b for the second joint portion 6 which is provided in a projecting manner in one side in the W axis direction of the rear surface of the disk-like portion 7a and which extends backwards and upwards. The movable bracket 6b is disposed so as to lie opposite to that stationary bracket 6a for the second joint portion 6 which is provided, at the front end of the first robot arm 5, in a projecting manner while being offset to the other side in the W axis direction. The driving reduction gear Rw of the second robot arm 7 is disposed between both the brackets 6a, 6b. In this manner, the dimension in the axial direction (W axis direction) of the second joint portion 6 can be contained inside the width in the W axis direction of the first robot arm 5, thereby attaining the miniaturization of the robot. Further, the disk-like portion 7a of the second robot arm 7 can also be contained inside the width in the W axis direction of the first robot arm 5. Therefore, the twisting load that operates on the first robot arm 5 via the second robot arm 7 can be reduced, with the result that the positioning accuracy of the robot can be improved. Still furthermore, in the present embodiment, as shown in FIG. 1, the driving reduction gear Ry of the first robot arm 5 and the driving reduction gear Rw of the second robot arm 7 are disposed so as to cross the identical central plane "a" including the Z axis which is the axis of rotation of the robot main body 3. The axially central portions of the first and second joint portions 4, 6 are positioned in the central plane "a." Therefore, the entire arm which is made up of the first robot arm 5 and the second robot arm 7 extends to lie along the central plane "a." The partial load that operates on the robot main body 3 can thus be reduced to the best extent possible to further improve the positioning accuracy of the robot. In addition, since there is no offset, the teaching becomes easier.

The driving reduction gear Rw of the second robot arm 7 is constituted by a CYCLO reduction gear which is similar to that shown in FIGS. 5A and 5B. The casing R1 and the shaft R3 of the reduction gear Rw are bolted to the stationary bracket 6a and the movable bracket 6b, respectively. In an intermediate portion of the first robot arm 5 there is laterally disposed the driving motor Mw of the second robot arm 7. A shaft of a driven pulley 15b which is coupled via a belt 15 to a drive pulley 15a on the output shaft of the driving motor Mw is coupled to an input gear R8 of the reduction gear Rw. The second robot arm 7 is thus arranged to be swung in the vertical direction by the driving motor Mw via the reduction gear Rw. In the figures, reference numeral 16 denotes a belt cover which is attached to the first robot arm 5.

On one side, in the W axis direction, of the rear surface of the disk-like portion 7a of the second robot arm 7, there is mounted the driving motor Mv of the wrist 8 in a position below the movable bracket 6b. The wrist 8 is attached to a front surface of the disk-like portion 7a via that driving reduction gear Rv of the wrist 8 which is coupled to the driving motor Mv. According to this arrangement, the driving motor Mv of the wrist 8 can be disposed in a better space efficiency so as to overlap the second joint portion 6. The length of the second robot arm 7 can thus be reduced, which is advantageous in the miniaturization of the robot.

Further, on an outer side surface of the movable bracket 6b, there is provided, in a projecting manner, a rib 6c so as to enclose the coupling portion to the reduction gear Rw. The movable bracket 6b is reinforced by this rib 6c to thereby secure a mounting strength of attaching the second robot arm 7 to the first robot arm 5. Further, to one side surface of the first robot arm 5, there is attached a cable cover 17 which extends forwards from the position in which the driving motor Mw is disposed towards the movable bracket 6b. Further, a flexible cable tube 18 is disposed in the space to be enclosed by the rib 6c. One end of the cable tube 18 is arranged to face the front inner surface of the cable cover 17, and the other end of the cable tube 18 is arranged to face the outside of the space via a perforation 6d which opens in a rearward circumferential portion of the rib 6c. The wiring materials to supply electric power to the driving motor Mv for the wrist 8 and the driving motor built in the wrist 8 are arranged to. pass from inside the first robot arm 5 to the cable tube 18 through the cable cover 17. In this manner, the space to be enclosed by the rib 6c is utilized as a space for arranging or laying out therein the wiring materials, and the layout of the wiring materials can be made neat. The movable bracket 6b is provided, in a projecting manner, with a small rib 6e which prevents the cable tube 18 from deflecting diametrically inwards of the movable bracket 6b.

The driving reduction gear Rv of the wrist 8 is constituted by one in which the input gear R8 is omitted from the CYCLO reduction gear shown in FIGS. 5A and 5B. The casing R1 and the shaft R3 of the reduction gear Rv are bolted to the disk-like portion 7a of the second robot arm 7 and the wrist 8, respectively. Here, the axial line of the reduction gear Rv, i.e., the V axis which is the axis of rotation of the wrist 8, is positioned in the above-described central plane "a" including the Z axis which is the axis of rotation of the robot main body 3, but the driving motor Mv of the wrist 8 is offset relative to the V axis. Then, there is provided on the V axis a hollow shaft 19 to which are fixed a gear 19a to be engaged with a gear on the output shaft of the driving motor Mv and a gear 19b to be engaged with the spur gear R7 of the reduction gear Rv. It is thus so arranged that the wrist 8 can be rotated about the V axis by the driving motor Mv via the hollow shaft 19 and the reduction gear Rv. According to this arrangement, there will be formed in the disk-like portion 7a of the second robot arm 7 and in the reduction gear Rv a throughgoing hollow portion which runs along the V axis. Then, a pipe 20 is mounted in this hollow portion, and a flexible cable tube 21 for inserting thereinto the wiring materials for the driving motor to be built in the wrist 8 is inserted into the pipe 20. The arrangement of the wiring materials for the wrist 8 is thus made neat.

In addition, between the base portion 3a and the cover portion 3b which constitute the robot main body 3, there is provided a fulcrum portion 22 which enables the cover portion 3b to incline forwards. The fulcrum portion 22 may also be constituted by a hinge which rotatably mounts the cover portion 3b on the base portion 3a so as to incline forwards. In the present embodiment, however, the fulcrum portion 22 is constituted, as shown in FIG. 6, by a projection 22a which is provided in a projecting manner on a front lower end of the cover portion 3b, and a support or a receiver 22b which is provided on a front surface of the base portion 3a so as to lie opposite to the lower side of the projection 22a. It is thus also so arranged that the cover portion 3b can be lifted as it is with a crane or the like.

Figure 10A:
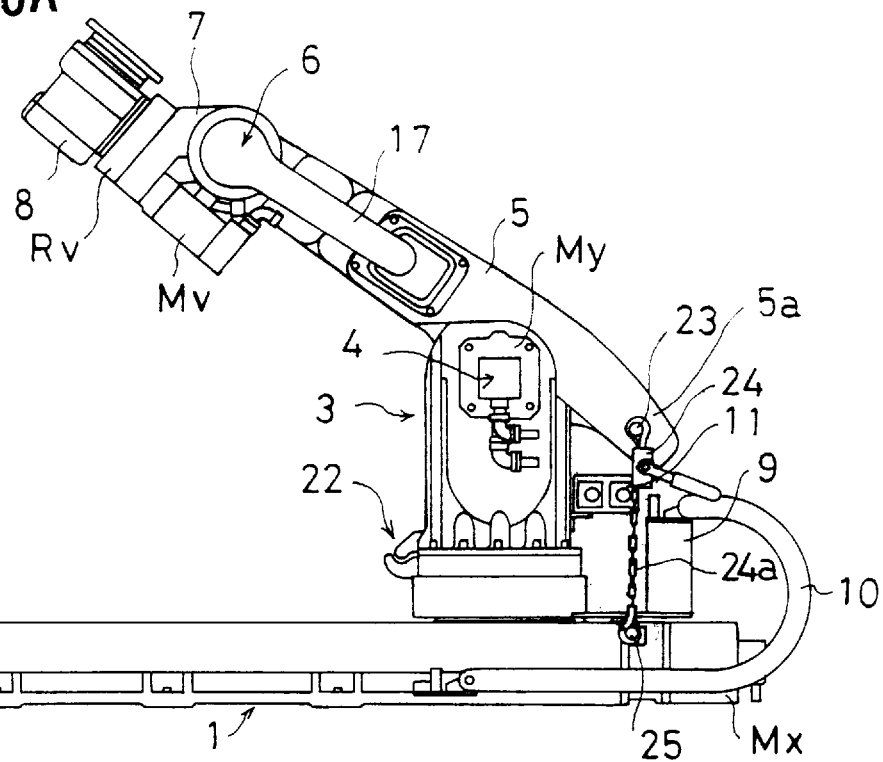
FIGS. 10A and 10B are side view showing a work of inclining the robot main boy at the time of maintenance.
Figure 10B:
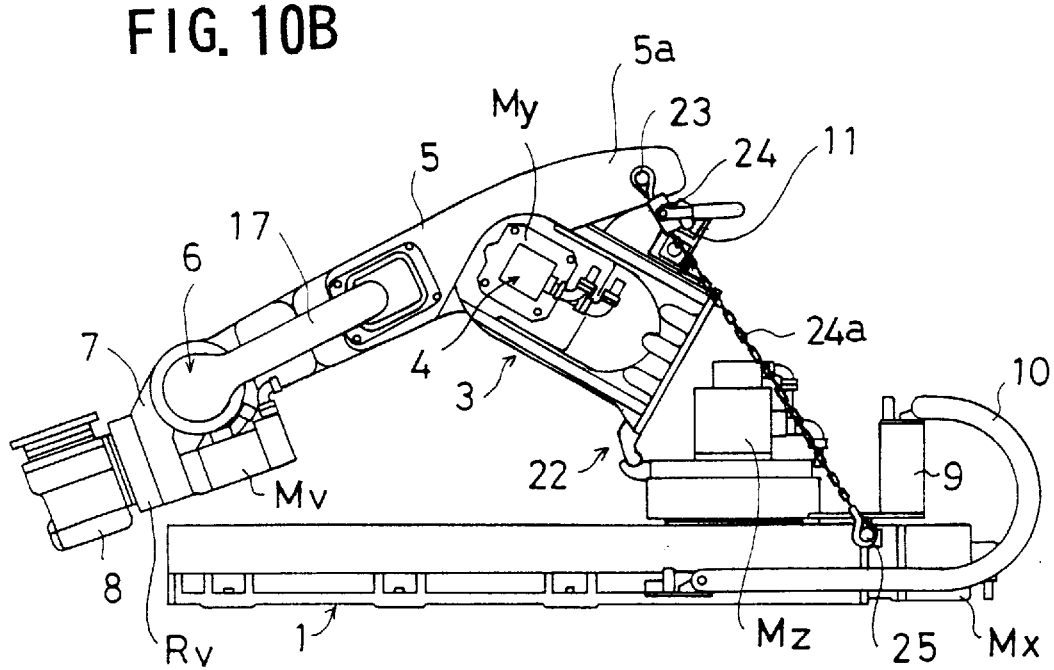

The first robot arm 5 is extended backwards of the first joint portion 4 and a hook portion 23 which is made of a projection is provided on one side surface of the extended portion 5a. Then, at the time of maintenance, a manual winch 24 is hooked to the hook portion 23 in a condition in which the first robot arm 5 is swung to an upwardly swung end position. A cable 24a such as a chain and a wire rope to be drawn or pulled out of the manual winch 24 is hooked to a hook portion 25 which is provided on one side surface of one end portion of the bed 1. In this condition, bolts that fix the cover portion 3b to the base portion 3a are removed, and the manual winch 24 is operated in a direction of pulling out or extending the cable 24a. According to this arrangement, due to the weight of the robot arms 5, 7 and of the wrist 8, the cover portion 3b inclines forwards while being supported by the fulcrum portion 22 as shown in FIG. 10B. As a result, the driving motor Mz which is otherwise covered with the cover portion 3b is exposed. In this manner, even a robot which is disposed in a place where a crane or the like cannot be positioned thereabove can be maintained only by means of hands by exposing the driving motor Mz. This results in an improvement in the ease with which the maintenance of the industrial robot can be performed.

The hook portions 23, 25 may also be constituted by holes. Further, the hook portion 25 for the cables 24a may also be provided in the movable table 2 or in the base portion 3a of the robot main body 3.

It is readily apparent that the above-described industrial robot meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An industrial robot comprising:
    a rotatable robot main body;
    a first robot arm which is mounted, via a first joint portion, on an upper end of said robot main body so as to be vertically swingable; and
    a second robot arm which is mounted, via a second joint portion, on a front end of said first robot arm so as to be vertically swingable,
    each of said first and second joint portions being arranged in a cantilevered construction in which each of said first and second robot arms is supported on said robot main body and on said first robot arm, respectively, in a manner cantilevered in an axial direction of each of said joint portions via a driving reduction gear of each of said first and second robot arms, respectively,
    wherein said driving reduction gears of said first robot arm and second robot arm are disposed so as to cross an identical central plane, an axis of rotation of said robot main body being located within said identical central plane.

2. An industrial robot according to claim 1,
    wherein, when a Y axis is defined to be an axial line of said first joint potion and a W axis is defined to be an axial line of said second joint portion, said first joint portion is constituted by forming a stationary bracket and a movable bracket on one side in the Y axis direction at an upper end of said robot main body and on the other side in the Y axis direction at a rear end of said first robot arm, respectively, in order to dispose said driving reduction gear of said first robot arm between both said brackets for said first joint portion, and wherein said second joint portion is constituted by forming a stationary bracket and a movable bracket on one side in the W axis direction at a front end of said first robot arm and on the other side in the W axis direction at a rear end of said second robot arm, respectively, in order to dispose said driving reduction gear of said second robot arm between both said brackets for said second joint portion.

3. An industrial robot according to claim 2, further comprising a rib provided in a projecting manner on an outer side surface of said movable bracket for said first joint portion so as to enclose a coupling portion to couple said first robot arm to said driving reduction gear of said first robot arm in order to utilize a space enclosed by said rib as a space for laying out therein a wiring material which is inserted into said first robot arm.

4. An industrial robot according to claim 2, further comprising a wrist which is attached to said second robot arm and which is rotatable about an axial line that extends alone a plane which crosses the W axis at right angles, wherein said second robot arm is arranged to have a flat disk-like portion which lies along a plane which crosses a V axis at right angles, said V axis being defined to be the axis of rotation of said wrist, wherein said movable bracket for said second joint portion is provided in an upwardly and backwardly projecting manner from a portion on said the other side in the W axis direction on a rear surface of said disk-like portion, wherein a driving motor of said wrist is attached to a portion on said the other side in the W axis direction on the rear surface of said disk-like portion below said movable bracket for said second joint portion, and wherein said wrist is attached to a front surface of said disk-like portion via that reduction gear of said wrist which is coupled to said driving motor.

5. An industrial robot according to claim 4, wherein each of said disk-like portion of said second robot arm and said driving reduction gear of said wrist has formed therein a hollow portion for inserting thereinto wiring materials for members provided for said wrist, said hollow portion penetrating through said disk-like portion and said driving reduction gear of said wrist along the V axis.

6. An industrial robot according to claim 4, further comprising a rib provided in a projecting manner on an outer side surface of said movable bracket for said second joint portion so as to enclose a coupling portion to couple said second robot arm to said driving reduction gear of said second robot arm in order to utilize a space enclosed by said rib as a space for laying out therein wiring materials for said driving motor of said wrist and for members equipped in said wrist.

7. An industrial robot according to claim 5, further comprising a rib provided in a projecting manner on an outer side surface of said movable bracket for said second joint portion so as to enclose a coupling portion to couple said second robot arm to said driving reduction gear of said second robot arm in order to utilize a space enclosed by said rib as a space for laying out therein wiring materials for said driving motor of said wrist and for members equipped in said wrist.

* * * * *